United States Patent [19]
Davis

[11] 3,761,654
[45] Sept. 25, 1973

[54] LATHE CHUCK WRENCH SAFETY DEVICE WITH CHUCK KEY ACTUATED MICROSWITCH

[76] Inventor: Roy S. Davis, Rt. No. 1, Box 12, Carterville, Ill.

[22] Filed: May 16, 1972

[21] Appl. No.: 253,815

[52] U.S. Cl... 200/61.58 R, 192/129 A, 200/169 R, 279/1 K
[51] Int. Cl............................ H01h 3/16, F16b 3/00
[58] Field of Search ...................... 200/44, 61.58 R, 200/61.62, 61.64, 61.66, 61.67, 61.68, 169 R; 192/129 A; 279/1 K; 408/710

[56] References Cited
UNITED STATES PATENTS 2,597,969  5/1952  Barton .................... 192/129 A UX
2,713,407  7/1955  Miller .................... 200/61.58 R UX
2,578,317  12/1951  Pealer ........................ 200/169 R Primary Examiner—J. R. Scott
Attorney—Linton & Linton

[57] ABSTRACT

A safety device including a switch interposed in the operating circuit of a lathe which requires the withdrawal of the lathe chuck wrench or key from the lathe chuck and its insertion in said device to operate said switch and permit the rotation of the lathe chuck as a safety precaution.

5 Claims, 6 Drawing Figures

PATENTED SEP 25 1973

3,761,654

SHEET 1 OF 2

LATHE CHUCK WRENCH SAFETY DEVICE WITH CHUCK KEY ACTUATED MICROSWITCH

The present invention is concerned with a safety device operable by a lathe chuck wrench or key for permitting the driving of the lathe chuck.

Lathes incorporating a work holding chuck of, for example, the independent, universal or combination types require the insertion of a chuck wrench or key into sockets provided in the periphery of the chuck for adjusting the chuck dogs or jaws to accommodate different sizes of work pieces and it is possible for the operator to start the lathe within the wrench or key on the chuck whereupon the wrench or key would be thrown outwardly possibly causing injury or damage. It is therefore essential that said wrenches or keys be withdrawn from the chucks before starting the operation of said chucks.

The principal object of the present invention is to provide a safety device that will prevent the driving of a lathe chuck until the chuck wrench or key is keyed into said device requiring the withdrawal of said wrench or key from the chuck and which safety device is adjustable for receiving wrenches or keys of different sizes.

Figure 1:
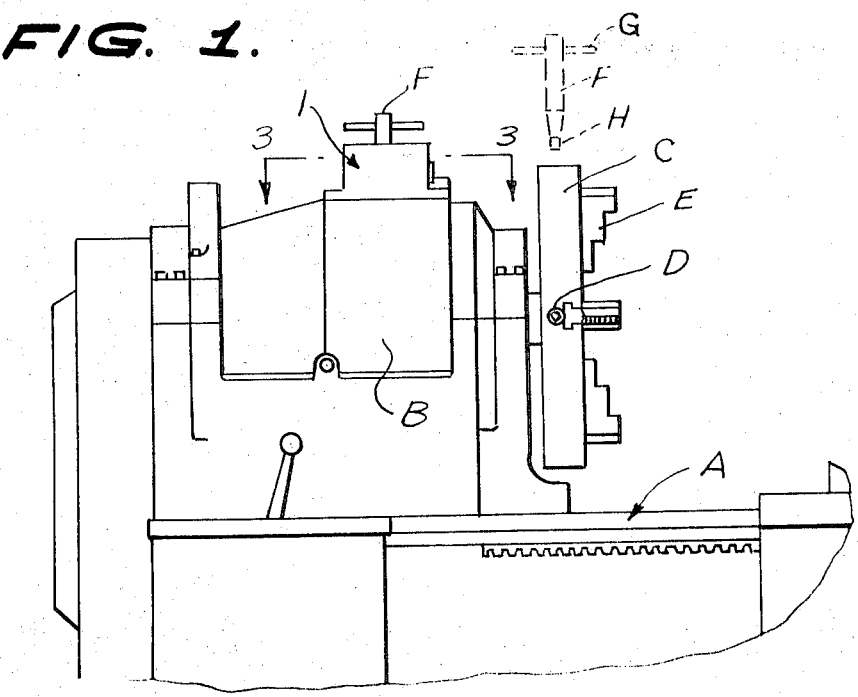
Figure 2:
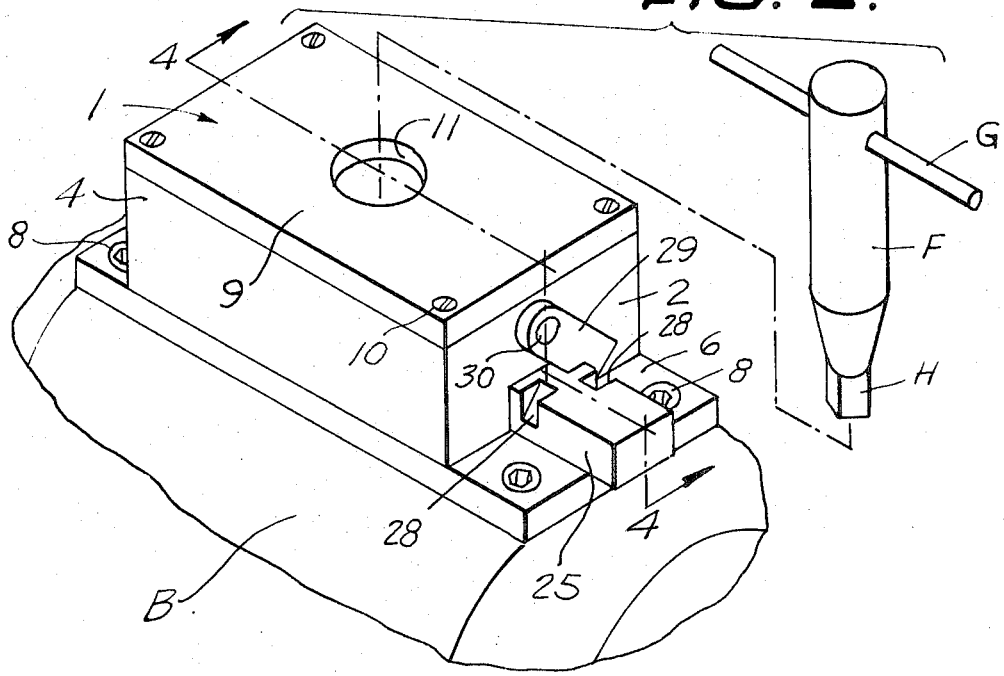
Figure 3:
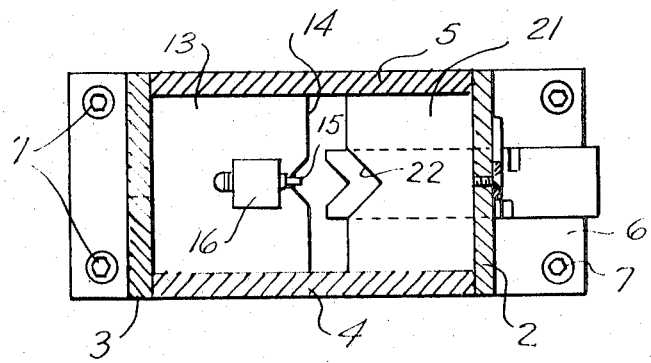
Figure 4:
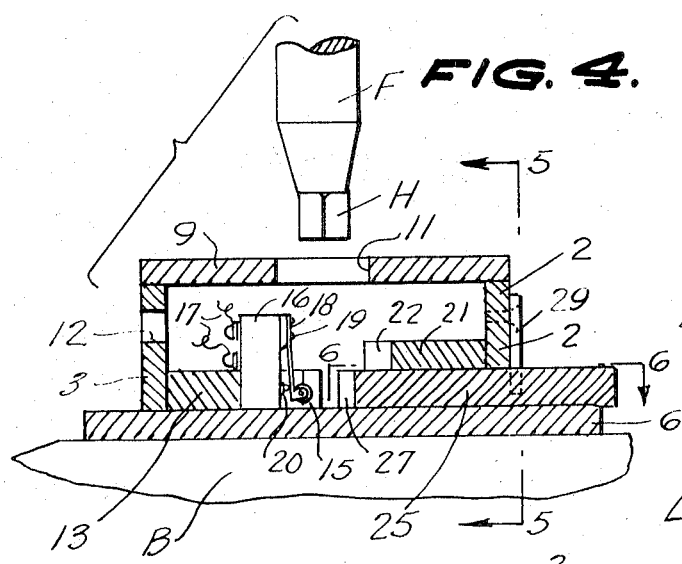
Figure 5:
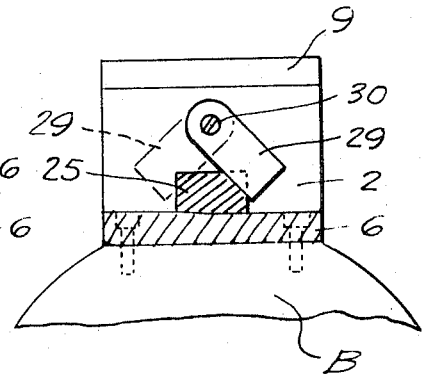
Figure 6:
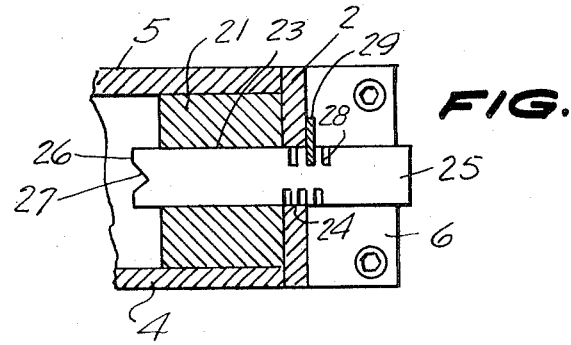

Further objects of the invention will be apparent from the following description of the accompanying drawings, in which, FIG. 1 is a front view of the chuck drive portion of a lathe including the present safety device thereon, FIG. 2 is an enlarged exploded perspective view of the safety device mounted on a chuck drive and a chuck wrench, FIG. 3 is a sectional view taken on line 3—3 of FIG. 1, FIG. 4 is an exploded sectional view taken on line 4—4 of FIG. 2, FIG. 5 is an end view taken on line 5—5 of FIG. 4, and FIG. 6 is a sectional view taken on line 6—6 of FIG. 4.

Referring now more particularly to the accompanying drawings wherein like and corresponding parts are indicated by similar reference characters, A generally indicates a lathe having a chuck drive housing B, chuck C with adjusting sockets D and dogs or jaws E. A chuck wrench F has handle G at one end and an opposite key end H capable of fitting into chuck sockets D and being rotated to adjust the positions of the jaws or dogs E according to the size of the work piece to be supported thereby. Said key ends H are of various sizes and have for example side widths of three-eighths inch, one-half inch or five-eighths inch depending on the size of the chuck socket D in which they are to be used. The foregoing lathe and elements thereof are conventional.

The present safety device comprises a box-like housing 1 having front end wall 2, rear end wall 3, side walls 4 and 5, base plate 6 having said walls fixedly attached thereto and with bolt openings 7 at each corner for the passage of machine screws or bolts 8 for attaching said face plate to any flat surface having threaded openings for said screws or bolts, such as the top of the chuck drive housing B, for example, as shown, and top cover 9 attached to the top edges of said walls by screws or bolts 10 and having an annular opening 11 for receiving wrench F therethrough.

Rear end wall 3 has opening 12 for the passage of electrical wires 17 therethrough which wires are interconnected in the conventional circuit (not shown) including controlling the supply of current to the chuck drive motor.

A block 13 is mounted on base plate 6 and extends from the inner face of said rear end wall between a portion of said side walls 4 and 5 and is attached thereto by any conventional means such as screws or welding. Block 13 has a front edge 14 extending normal to side walls 4 and 5 and a V-shaped notch 15 in the medial portion of edge 14.

A normally open micro-switch 16 is seated in said block 13 and has a leaf spring 18 attached to said micro-switch by pins 19 and with said leaf spring positioned in the apex of notch 15 and extending over the control button 20 of said micro-switch.

An inverted U-shaped block 21 is mounted on base plate 6 and extends from the inner face of front end wall 2 between adjacent portions of side walls 4 and 5 and is attached thereto by conventional means such as screws or welding. The free edge of block 21 has a V-shaped notch 22 in the medial portion of the base of said block. The inverted U-shaped configuration of block 21 provides a channel 23 of rectangular cross-section with base plate 6.

Front end wall 2 has an opening 24 in line with and of the same configuration as the cross-section of channel 23.

A bar 25 having a cross-sectional configuration similar to, but slightly smaller than that of channel 23 and opening 24, is slideably mounted on said base plate 6 and through channel 23 and opening 24. Bar 25 has an inner end portion with end 26 having a V-shaped medial notch 27 and has series of notches 28 along its opposite end portion. Each series of notches 28 have the notches thereof spaced apart and offset relative to the notches of the other series. Also only one notch can be provided at each side of block 25 as shown in FIG. 2 or a plurality of notches 28 on each side of block 25 as shown in FIG. 6.

A plate 29 is pivotally connected to the outer face of front end wall by a screw, bolt or rivet 30 and is of a thickness for detachably mating with one of said notches 28 at a time.

While base plate 6 is shown attached to chuck drive housing B it can equally as well be attached to other surfaces of the lathe or adjacent thereto such as a work bench, as is desired.

In the use of the safety device, bar 25 is slid longitudinally in either direction until notches 15 and 27 form a socket which will mate with key end H of the particular wrench F currently being used in sockets D. Plate 29 is slid into the notch 28 contiguous with the outer face of front end wall 2 as shown in FIGS. 2 and 6 retaining bar 25 in position. Said wrench F then has its key end moved from chuck C and inserted through opening 11 as shown in the dash-dot line of FIG. 2 until key end H mates between notches 15 and 27. Upon the wrench key end sliding along leaf spring 18 it moves said spring towards micro-switch 16 depressing button 20 closing said switch completing the chuck drive circuit of lathe A causing said chuck C to rotate.

Withdrawal of chuck key end H from opening 11 allows leaf spring 18 to spring outwardly releasing button 20, opening microswitch 16 and breaking the chuck drive circuit of the lathe causing chuck C to stop rotating whereupon wrench F can be used to open jaws E and release the work piece therefrom.

I claim:

1. In a lathe having an electric chuck drive circuit and wrench adjusted chuck, a safety device comprising a chuck wrench, a housing having an opening for the insertion of said chuck wrench, a socket in said housing capable of mating with said chuck wrench and a normally open electrical switching means consisting of a micro-switch interconnected in the chuck drive circuit and having a control element extending into said socket for being engaged and depressed by said chuck wrench whereby said depressed control element closes said switching means and said circuit for rotating said chuck.

2. In a lathe having an electric chuck drive circuit and wrench adjusted chuck, a safety device as claimed in claim 1 wherein said housing has a base plate and an end opening, and said socket consists of a block attached to said base plate, having an end notch and a bar slideable on said base plate through said housing end opening and having an end notch facing said block notch and means for retaining said bar in anyone of a plurality of positions spaced from said block.

3. In a lathe having an electric chuck drive circuit and wrench adjusted chuck, a safety device as claimed in claim 2 wherein said retaining means consists of notches on said bar and a plate pivotally connected to said housing in a position for entering one of said notches at a time.

4. In a lathe having an electric chuck drive circuit and wrench adjusted chuck, a safety device as cliamed in claim 2 wherein said switching means has a control button extending into said block notch whereby insertion of said wrench into said notches depresses said button closing said switching means.

5. In a lathe having an electric chuck drive circuit and wrench adjusted chuck, a safety device as claimed in claim 4 including a leaf spring connected to said switching means and extending over said button.

* * * * *